United States Patent [19]
Shono

[11] 3,967,299
[45] June 29, 1976

[54] SINGLE LENS REFLEX CAMERA WITH INTERCHANGEABLE VIEW FINDER HAVING ELECTRICAL COUPLING

[75] Inventor: Tetsuji Shono, Saitama, Japan

[73] Assignee: Asahi Kogaku Kogyo Kabushiki Kaisha, Tokyo, Japan

[22] Filed: Sept. 13, 1974

[21] Appl. No.: 505,713

[30] Foreign Application Priority Data
Sept. 20, 1973 Japan.............................. 48-106259

[52] U.S. Cl. .............................................. 354/219
[51] Int. Cl.² ........................................ G03B 13/02
[58] Field of Search ..................... 354/53–57, 354/60, 152, 155, 156, 219, 224, 225

[56] References Cited
UNITED STATES PATENTS

| | | | |
|---|---|---|---|
| 3,733,984 | 5/1973 | Yata | 354/56 X |
| 3,812,499 | 5/1974 | Hayashi et al. | 354/24 |
| 3,868,711 | 2/1975 | Sekida et al. | 354/604 |

*Primary Examiner*—Richard A. Wintercorn
*Attorney, Agent, or Firm*—Wolder & Gross

[57] ABSTRACT

A single lens reflex camera includes a separable view finder provided with a casing housing a pentaprism and electrical components. A set of laterally spaced contact pins depend from a shoulder in the casing forward of the pentaprism lower front surface and are connected to casing housed electrical components. The camera body also houses electrical components which are connected to resilient contact fingers mounted on the forward part of the camera body and underlying and releasably engaged by the contact pins. A slideable cover strip is spring urged to a position overlying the contact fingers and is retracted by the contact pins with the sliding coupling of the view finder to the camera body.

6 Claims, 4 Drawing Figures

3,967,299

SINGLE LENS REFLEX CAMERA WITH INTERCHANGEABLE VIEW FINDER HAVING ELECTRICAL COUPLING

BACKGROUND OF THE INVENTION

The present invention relates generally to improvements in single lens reflex cameras and it relates more particularly to improved single lens reflex cameras having a separable pentaprism view finder in which the electrical components are housed in the view finder and camera body are intercoupled with the mounting of the view finder to the camera body.

In a single lens reflex camera wherein the view finder section is interchangeable depending on the photographing purpose, an electric circuit for the purpoe of TTL photometry and other electric circuits are generally arranged bridging the view finder section and the camera body mounting the view finder section. This arrangement adds to the importance of the electrical connection between the view finder section and camera body as well as the accommodation of lead wires. In a view finder interchangeable single lens reflex camera of the above type, the electrical connection between the electric circuits provided in the view finder section and the electric circuits provided in the camera body must be reliably established each time the view finder section is mounted on the camera body. To conveniently achieve such an electrical connection, various arrangements have been heretofore proposed, but no satisfactory arrangement has yet been achieved.

SUMMARY OF THE INVENTION

It is a principal object of the present invention to provide an improved single lens reflex camera.

Another object of the present invention is to provide an improved single lens reflex camera of the interchangeable view finder type.

Still another object of the present invention is to provide an interchangeable view finder single lens reflux camera having cooperating electrical circuits or components housed in the camera body and in the view finder.

A further object of the present invention is to provide a single lens reflex camera of the above nature characterized by its high reliability, compactness, ruggedness, simplicity, ease of operation and great versatility and adaptability.

The above and other objects of the present invention will become apparent from a reading of the following description taken in conjunction with the accompanying drawings which illustrate a preferred embodiment thereof.

A view finder section may be separably mounted on the camera body generally in two different manners: in a first manner, or drop-in mounting, the view finder section may be dropped into the camera body from above; whereas in a second manner, or slide mounting, the view finder section may be slid into the camera body forwardly or rearwardly. In the following description, although the invention will be described in connection with a device of the slide mounting type, it may equally be applied to the device of drop-in mounting and any other mounting types.

The present invention, in a sense, contemplates the utilization of the space defined between the reflecting third surface of the pentagonal roof prism employed in the single lens reflex camera and the camera body mounting the pentagonal roof prism. In other words, within such space a suitable connector half-portion is mounted on the view finder section and a corresponding connector half-portion is mounted on the camera body. The device of this invention includes a connector cover which is so arranged as to be automatically displaced to its retracted position upon mounting the view finder section and to be automatically displaced to its connector covering position upon detaching the view finder section. Advantages provided by such an arrangement are as follows:

1. The accommodation of connectors within such a space underlying and proximate the pentaprism third surface which is conventionally of no use, results in almost no substantial change in the entire volume of the camera, allowing for a compact camera.

2. For a 35mm camera, for example, such space defined by the view finder section has a width of more than 36mm which is wide enough to accommodate the connectors and a number of associated lead wires within the space.

3. The provision of a connector cover assures a reliable electrical contact between the electric circuits arranged in the view finder section and camera body, because the connector cover prevents dusts and other foreign matter being deposited on the connector and also prevents the danger that the operator unintentionally touches the connector with his finger.

DESCRIPTION OF THE PREFERRED EMBODIMENT

Figure 1:
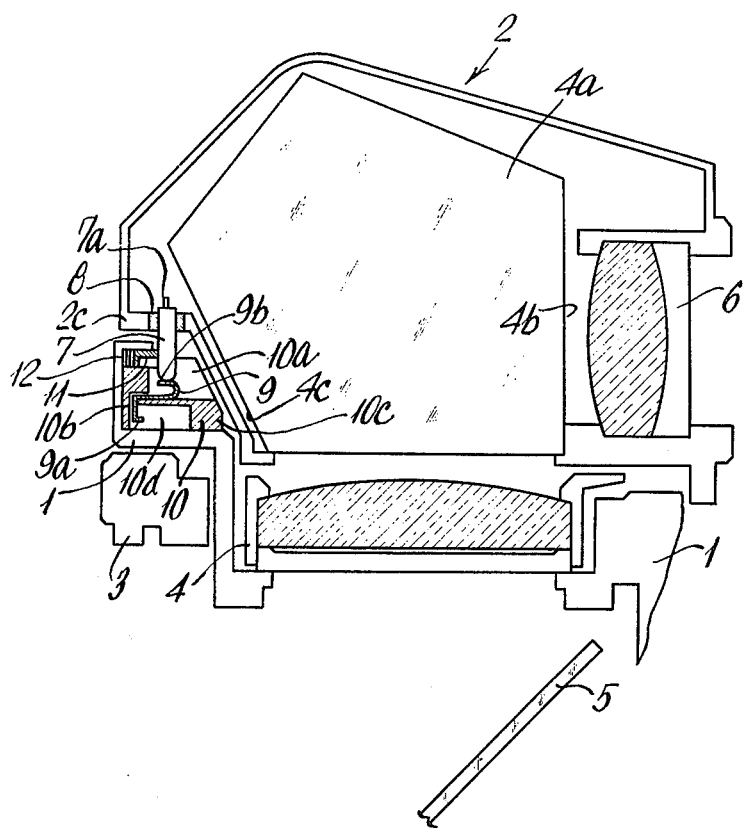
FIG. 1 is a vertical medial sectional view of the view finder section according to one embodiment of the present invention, the view finder section being shown in a position mounted on the camera body.

Referring now to the accompanying drawings which illustrate a preferred embodiment of the present invention as applied to a 35mm camera, the reference numeral 1 generally designates a single lens camera body on which a view finder section 2 is slidingly mounted from the rear of the camera body. A lens mount 3 is located at the front of the camera body 1. Indicated at 4 is an interchangeable focussing screen block or member which is releasably mounted on the camera body 1 so that it is interchangeable with other focussing screen blocks depending on the desired photographing purpose. A retractable reflecting mirror 5 and a viewing eyepiece 6 are arranged in opposition to a light-emerging rear surface 4b of a pentagonal roof prism (hereinafter referred to as pentaprism) which is housed in the pentaprism casing or section 2. At a stepped portion 2c of the view finder section or casing 2 disposed in front of a third upwardly forwardly inclined third surface 4c of the pentaprism 4a are arranged a plurality of electrical contact element defining connector pins 7 associated with the view finder section 2 and connected to a second electrical circuit housed in the pentaprism housing casing. In the shown embodiment, ten separate such connector pins 7 are arranged in a row each of which is fixedly supported by the stepped portion or horizontal shoulder 2c by an insulating member 8. In association with the connector pins 7 are fixedly arranged ten separate connector or contact elements 9 on the camera body 1 by means of a connector mount or holder 10 made of an insulating material and connected to a first electrical circuit housed in the camera body. The connector elements 9 include resilient fingers or members which, upon mounting the view finder section 2, resiliently contact or engage the rounded bottom ends or underfaces of the connector pins 7 to maintain a good electrical contact between them.

Figure 2:
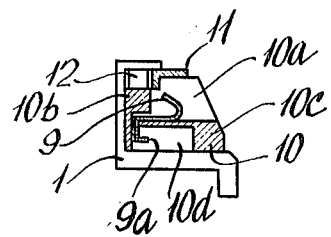
FIG. 2 is a vertical sectional view of the connector portion included in the camera body, the connector portion being shown in a view finder section detached position.
Figure 3:
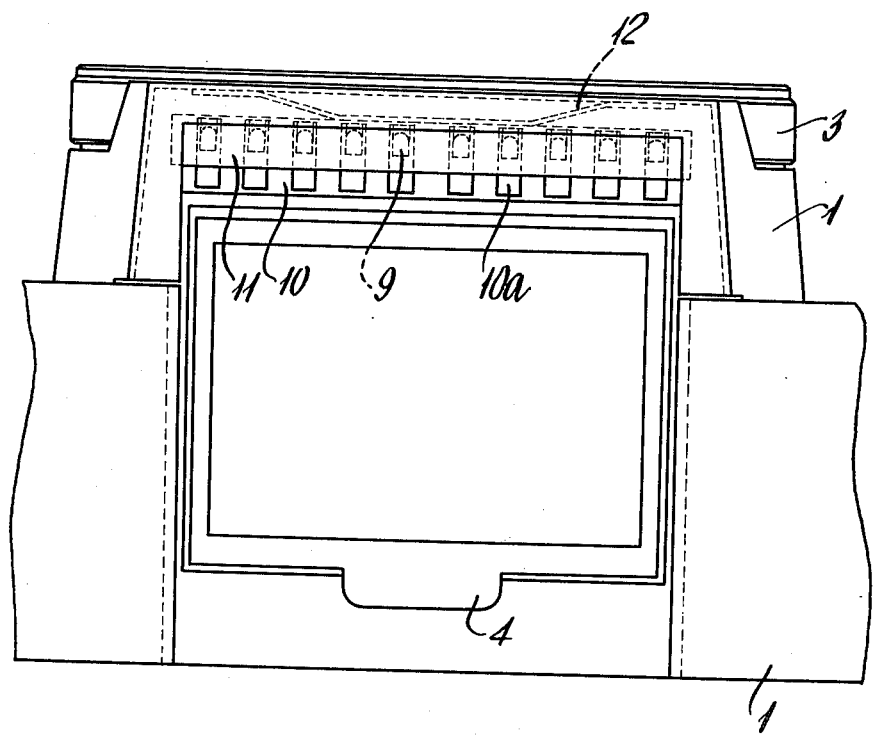
FIG. 3 is a fragmented elevational view of the camera body shown in a view finder section detached position.

The connector holder 10 includes an upper holder portion 10b of inverted L-shaped transverse cross section and has recessed portions 10a formed therein at pre-selected intervals and also includes a lower holder portion 10c having a turned L-shaped transverse cross section. The connector elements 9 which are of approximately Z-shape are held between the upper and lower holder portions 10b and 10c in the recessed portions 10a, so that the forward ends 9b of the bent connector elements 9 are in opposition to the corresponding connector pins 7, whereas the trailing lower ends 9a of the connector elements 9 extend into a groove 10d delineated by and between the lower and upper holder portions 10c and 10b, thereby facilitating the connection of lead wires to the connector elements 9. A connector cover 11 made of an insulating material is normally slideably, rearwardly resiliently urged by a spring 12 (rightwards as viewed in FIGS. 1 and 2) to a position overlying the connector elements 9. Thus, upon moving the connector pins 7 to the engage or connecting position, the connector cover 11 is moved forwardly and covers and provides vertical access to the connector elements 9.

Figure 4:
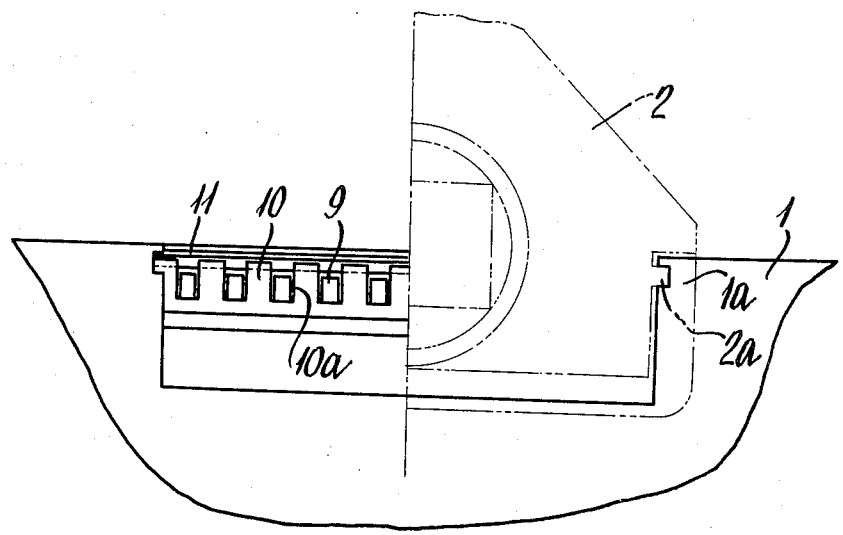
FIG. 4 is a rear elevation of FIG. 3 and also illustrating the connection between the camera body and view finder section.

In the embodiment of the present invention illustrated in the drawings and having the foregoing construction, the view finder section 2 is mounted on the camera body 1 by slidingly inserting ridges 2a formed on the view finder section casing into corresponding grooves 1a formed in the camera body 1 (FIG. 4). Upon inserting the view finder section 2, the connector pins 7 enter corresponding recessed portions 10a in the connector holder 10 until the rounded bottom ends of the connector pins 7 are brought into contact with the forward ends 9a of the corresponding connector elements 9 to complete or form the associated electrical circuits. Under these conditions, the connector pins 7 push the forward ends 9b of the corresponding connector elements 9 so that the connector elements 9 are bent from the position shown in FIG. 2 to the position shown in FIG. 1. Accordingly, reliable electrical connections are established between the corresponding connector pins 7 and connector elements 9 by the resilient force of the bent connector elements 9. At this time, the connector cover 11 is pushed forwards as the connector pins 7 are inserted into increasingly deeper positions and is automatically displaced from its covering position to its retracted position while compressing the spring 12. Thus, the sliding insertion of the view finder section 2 into the camera body 1 simultaneously and automatically establishes the required electrical circuits.

When slideably detaching the view finder section 2 from the camera body 1, the connector pins 7 are simultaneously rearwardly displaced in the direction reversed to that mentioned previously and the forward pressure against the connector cover 11 is released, so that the connector cover 11 is returned under the influence of spring 12 rearwardly of the camera body 1 and covers the connector elements 9.

In assembling the various electrical components, as mentioned previously, the lead wires forming the electrical circuits in the view finder section may be soldered to projections 7a formed on the upper or inner ends of the connector pins 7, whereas the lead wires forming the electrical circuits in the camera body may be connected to the end portions 9a of the connector elements 9, similarly by soldering. The resilient contact between the connector pins 7 and corresponding connector elements 9 may be attained by providing resiliency or resilient loading to either one of these associating components and not necessarily only to the connector elements 9. In the shown embodiment, although the connector cover 11 is so arranged as to be displaced by the connector pins 7 to its retracted position, it is apparent that this may be effected by any suitable portions of the view finder section 2. Furthermore, although the illustrated embodiment is applied to a view finder section of slide mounting type, the improved structure may easily be applied also to a view finder section of the drop-in mounting type by simply modifying the configuration of the connector.

While there has been described and illustrated a preferred embodiment of the present invention, it is apparent that numerous alterations, omissions and additions may be made without departing from the spirit thereof.

I claim:

1. A single lens reflex camera comprising a camera body having a lens carrying front face and a rear face and housing a first electrical circuit, a view finder interchangeably mounted on said camera body and forwardly and rearwardly slidable between coupled and uncoupled positions on said camera body and including a pentaprism having a lower front upwardly, forwardly inclined third surface and a casing housing said pentaprism and a second electrical circuit, a first electrical connector connected to said first circuit and mounted on said camera body and disposed in the area proximate and forward of said pentaprism third surface, a second electrical connector connected to said second circuit and mounted on said casing proximate said pentaprism third surface and releasably coupled to said first connector and moveable with the separation of said view finder from said camera body out of coupling engagement with said first connector and a cover member resiliently biased to overlie said first connector and retractable to a position exposing said first connector in response to the application of said view finder to said camera body.

2. The camera of claim 1 wherein said first connector includes a plurality of mutually insulated first contact elements and said second connector includes a plurality of mutually insulated second contact elements releasably engaging said respective first contact elements.

3. The camera of claim 2 wherein at least one of each pair of said first and second contact elements is resiliently biased into engagement with the other contact elements.

4. The camera of claim 2 wherein said casing includes an upwardly forwardly inclined lower front wall parallel to said pentaprism third surface and terminates at its upper edge below the top of the pentaprism third surface in a forwardly directed flange, said second contact elements comprising pin elements depending from said flange.

5. The camera of claim 4 wherein said first contact elements comprise rearwardly directed upwardly biased resilient fingers engaging the underfaces of respective pins.

6. For use in a single lens reflex camera wherein a view finder section can be interchangeably mounted on the camera body and is forwardly slideable to a position coupled to the camera body and rearwardly slideable to a position detached from the camera body, a view finder interchanging device characterized in that connectors adapted to connect the electric circuits in the view finder section to the electric circuits in the camera body are arranged in front of the third reflecting surface of a pentaprism included in the view finder optical system; and a connector cover is so arranged that it is displaced to a retracted position upon mounting the view finder section on the camera body and covers the connector portions with the view finder section detached from the camera body.

* * * * *